United States Patent
Ozer et al.

(10) Patent No.: US 6,708,335 B1
(45) Date of Patent: Mar. 16, 2004

(54) TRACKING VIEWING BEHAVIOR OF ADVERTISEMENTS ON A HOME ENTERTAINMENT SYSTEM

(75) Inventors: Stuart Ozer, San Francisco, CA (US); Timothy F. Park, Menlo Park, CA (US); Daniel J. Zigmond, Carnation, WA (US); Michael A. Killianey, San Mateo, CA (US)

(73) Assignee: Webtv Networks, Inc., Mountain View, CA (US)

( * ) Notice: Subject to any disclaimer, the term of this patent is extended or adjusted under 35 U.S.C. 154(b) by 0 days.

(21) Appl. No.: 09/376,631

(22) Filed: Aug. 18, 1999

(51) Int. Cl.[7] .............................. H04N 7/16; H04N 9/00
(52) U.S. Cl. ............................ 725/20; 725/10; 725/39; 725/110
(58) Field of Search ...................... 725/14, 18, 20, 725/34, 39, 19, 109, 110, 22, 9

(56) References Cited

U.S. PATENT DOCUMENTS

| | | | | |
|---|---|---|---|---|
| 5,305,464 A | | 4/1994 | Frett ............................. 455/2 |
| 5,481,294 A | * | 1/1996 | Thomas et al. ............... 725/20 |
| 5,600,378 A | * | 2/1997 | Wasilewski ................... 725/39 |
| 5,758,259 A | * | 5/1998 | Lawler .......................... 725/45 |
| 5,774,170 A | * | 6/1998 | Hite et al. ..................... 725/34 |
| 5,819,156 A | * | 10/1998 | Belmont ........................ 725/14 |
| 5,857,190 A | * | 1/1999 | Brown .......................... 707/10 |
| 5,872,588 A | * | 2/1999 | Aras et al. ................... 725/110 |
| 5,961,603 A | * | 10/1999 | Kunkel et al. ............... 709/225 |
| 6,002,394 A | * | 12/1999 | Schein et al. ................. 725/39 |
| 6,177,931 B1 | * | 1/2001 | Alexander et al. ............. 725/52 |
| 6,202,210 B1 | * | 3/2001 | Ludtke .......................... 725/20 |
| 6,353,929 B1 | * | 3/2002 | Houston ........................ 725/20 |
| 6,457,010 B1 | * | 9/2002 | Eldering et al. ............... 725/14 |
| 6,530,082 B1 | * | 3/2003 | Del Sesto et al. ............... 725/9 |

FOREIGN PATENT DOCUMENTS

| WO | WO 9641495 A1 | * | 12/1996 | ............. H04Q/9/02 |
|---|---|---|---|---|
| WO | WO 9826529 A2 | * | 6/1998 | .......... H04H/15/00 |
| WO | WO 200035131 A1 | * | 6/2000 | ............. H04H/1/00 |

* cited by examiner

Primary Examiner—John Miller
Assistant Examiner—Scott Beliveau
(74) Attorney, Agent, or Firm—Workman Nydegger

(57) ABSTRACT

Systems and methods for tracking viewing behavior of advertisements on home entertainment systems. A processing device associated with the home entertainment system determines that an advertisement is being displayed. For example, the processing device can recognize an identifying marker embedded in the television signal that carries the advertisement. Alternatively, an electronic program guide supplemented with information identifying advertisements can be used to determine that a channel tuned and displayed at the home entertainment system carries a particular advertisement. The processing device generates viewing behavior information that identifies the advertisement and stores the information locally. The information is periodically transmitted to a central clearinghouse for storage and distribution to advertisers or other interested parties. The clearinghouse receives viewing behavior information from a plurality of home entertainment systems, which represents and describes the advertisements being viewed, the origin of the advertisements, and the way in which the advertisements are viewed.

14 Claims, 6 Drawing Sheets

TRACKING VIEWING BEHAVIOR OF ADVERTISEMENTS ON A HOME ENTERTAINMENT SYSTEM

BACKGROUND OF THE INVENTION

1. The Field of the Invention

The present invention relates to a system and method for tracking the viewing of advertisements on a home entertainment system. More specifically, the present invention is directed to a method for tracking the viewing of an advertisement by recognizing an identifying marker that has been placed in the advertisement or otherwise recognizing that a tuner in the home entertainment system has tuned to a channel that is carrying the advertisement.

2. The Prior State of the Art

Historically, television has been a source of entertainment for the general public and a medium through which an enormous number of individuals can be reached. Businesses recognize the value of this medium and take advantage of it by annually investing billions of dollars into the purchase of airtime for television programs and commercials.

Because the financial investment into television is so enormous, specific information as to what the public is viewing on television is a valuable commodity. The knowledge of information such as the audience share of television programs allows for the development of marketing and advertising schemes, program schedules, price rates for airtime, retention or termination of television programs, and the creation of new programs desired by the public.

The audience share watching television programs is particularly valuable to advertisers. Advertisers target audiences by airing their advertisements at a time when the types of customers that would be most interested in their product or service would be viewing the television. Indeed, a primary use for viewing behavior information is to set advertising rates based on the number of advertisement exposures that advertisers can expect on particular television programs.

The methods that have been employed to gather information on viewer behavior associated with television programs have been extremely limited as to the amount and type of information that is gathered and have not tracked advertisements viewed. By way of example, members of the viewing public can be paid to record in logbooks the television channels they watch during a sample period of time and then mail the logbooks to a central location after the completion of the sample period. At the central location, the channels watched and recorded in the logbooks are manually entered into a database and processed centrally to obtain usable data that represents television programs viewed.

The volume of information that can be obtained according to this technique is inherently limited because viewers are generally not willing to invest large portions of time to register an abundance of information in logbooks. Therefore, it would be impractical to request viewers to log every advertisement they view into a logbook. Further, a viewer's desire to quickly complete the registering of information and the existence of mistakes in the registering process introduces human error into the data sample. The manual nature of this approach coupled with the non-electronic form of the data make it inefficient for use with automated and computer-based forms of data processing.

Another method for tracking the viewing of television programs involves installing devices in the homes of viewers to monitor and record the channels tuned during a sample period. Each viewer of a household is assigned a symbol recognizable to the device and is responsible to select that symbol to indicate that he or she is watching the television. From time to time the device flashes a red light to remind the viewers to select their corresponding symbol. The viewing information, including the channels and the viewing date and time recorded by the devices, is transmitted to a central location. The viewing information is converted into a usable form at the central location by, for example, converting data that identifies the channel to data representing the corresponding television program. This conversion process can involve a significant amount of data processing, because the television programming that is broadcast on a given channel at a specified time can vary from locality to locality. Furthermore, this method relies on a broadcaster encoding each program for detection by the device and is therefore inappropriate for tracking less popular, locally produced, or exclusively cable-based programming. Therefore, this method is also undesirably limited in the amount and type of viewing information that is obtained since it only returns the channels, the viewing date and the time recorded by the devices.

Using any of the foregoing techniques, advertisers have had to simply infer advertisement viewing based on viewing of television programs (i.e., sitcoms or news programs) that have advertisements included therein. None of the foregoing techniques can determine whether viewers have changed channels during, or prior to, advertisements, or whether a particular advertisement has actually been broadcast as expected by a local broadcaster.

It would, therefore, be an advancement in the art to generate specific advertisement viewing behavior information. Such information would be particularly useful if it could be readily adapted to advertisements aired on a variety of television programming, such as local programming, network programming, cable programming, or satellite programming. It would be a further advancement in the art to obtain information relating to the use of interactive features by a viewer while watching television programming that carries an advertisement. Furthermore, it would be desirable to track and measure channel surfing or other similar viewer behavior of viewers in response to advertisements. There is also a need for techniques to enable advertisers to verify that advertisements have been broadcast as expected by local broadcasters.

SUMMARY OF THE INVENTION

The present invention is directed to a system and method for tracking advertisement viewing behavior aired by a home entertainment system and overcomes the above-mentioned difficulties by being fully automated and providing information regarding viewer behavior of advertisements displayed by a home entertainment system. A processing device associated with the home entertainment system determines that a particular advertisement, rather than merely a television program, is being displayed. In response, viewing behavior information describing or representing the viewing of the advertisement is generated and stored. The viewing behavior information is transported to a remote location on a periodic basis.

Implementation of the present invention may take place in application specific set-top boxes, cable or satellite boxes, Internet set-top boxes, television sets, personal computers, or any other device that is included in a home entertainment system which has a tuner, a network connection to transmit information to a central server, and data storage and processing capabilities to perform the operations disclosed herein.

One technique whereby the processing device recognizes an advertisement utilizes markers encoded in the vertical blanking interval ("VBI") or the overscan region of the television signal that carries the advertisement. The act of a home entertainment system recognizing the marker as it is received on a tuned channel indicates that the advertisement was viewed on that home entertainment system. This event is then coupled with specific information to the advertisement aired, such as the date and time of the advertisement or the channel or television programming associated with the advertisement. This information can be retrieved, for instance, from an electronic program guide.

In an alternative approach encompassed by the invention, a conventional electronic program guide is supplemented with information identifying the advertisements included in the television programming and the time when they are to be broadcast. The processing device associated with the home entertainment system monitors the electronic program guide and the tuned channel, thereby identifying advertisements that are being displayed at the home entertainment system. In response, viewing behavior information describing the viewed advertisements can be generated, stored, and periodically transmitted to a central or remote location. Using the electronic program guide, or one or more databases located at a central clearinghouse, any supplemental information regarding the advertisement or the associated television programming can be included in the viewing behavior information. The date and time that the events are performed can also be monitored and recorded. An electronic device in which the methods of the invention are implemented can be preprogrammed with the current time, date, time zone, week number, and day of the week. Accordingly, detailed viewing behavior, such as whether the viewer encountered the advertisement during channel surfing or whether the viewer changed the channel in response to the advertisement, can be monitored and recorded.

The foregoing process of tracking, storing, and transmitting viewing behavior information can be performed in home entertainment systems at any number of locations. The viewing behavior information is received from these locations at one or more central sites or clearinghouses, where it can be further processed and made available to any interested entities.

The present invention provides for a more accurate measurement and a greater variety of viewing behavior information. Advertisers can now specifically determine viewing statistics associated with advertisements rather than merely inferring advertisement viewing based on the number of viewers of particular television programs. The invention also enables advertisers to gauge the response of viewers to advertisements. Yet another benefit of the invention is the ability of advertisers to verify that advertisements have been broadcast as expected by local broadcasters. In particular, if viewing behavior information has been generated in response to a marker associated with an advertisement having been received at a home entertainment system, the advertiser can assume that the advertisement has been aired.

Additional objects and advantages of the invention will be set forth in the detailed description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
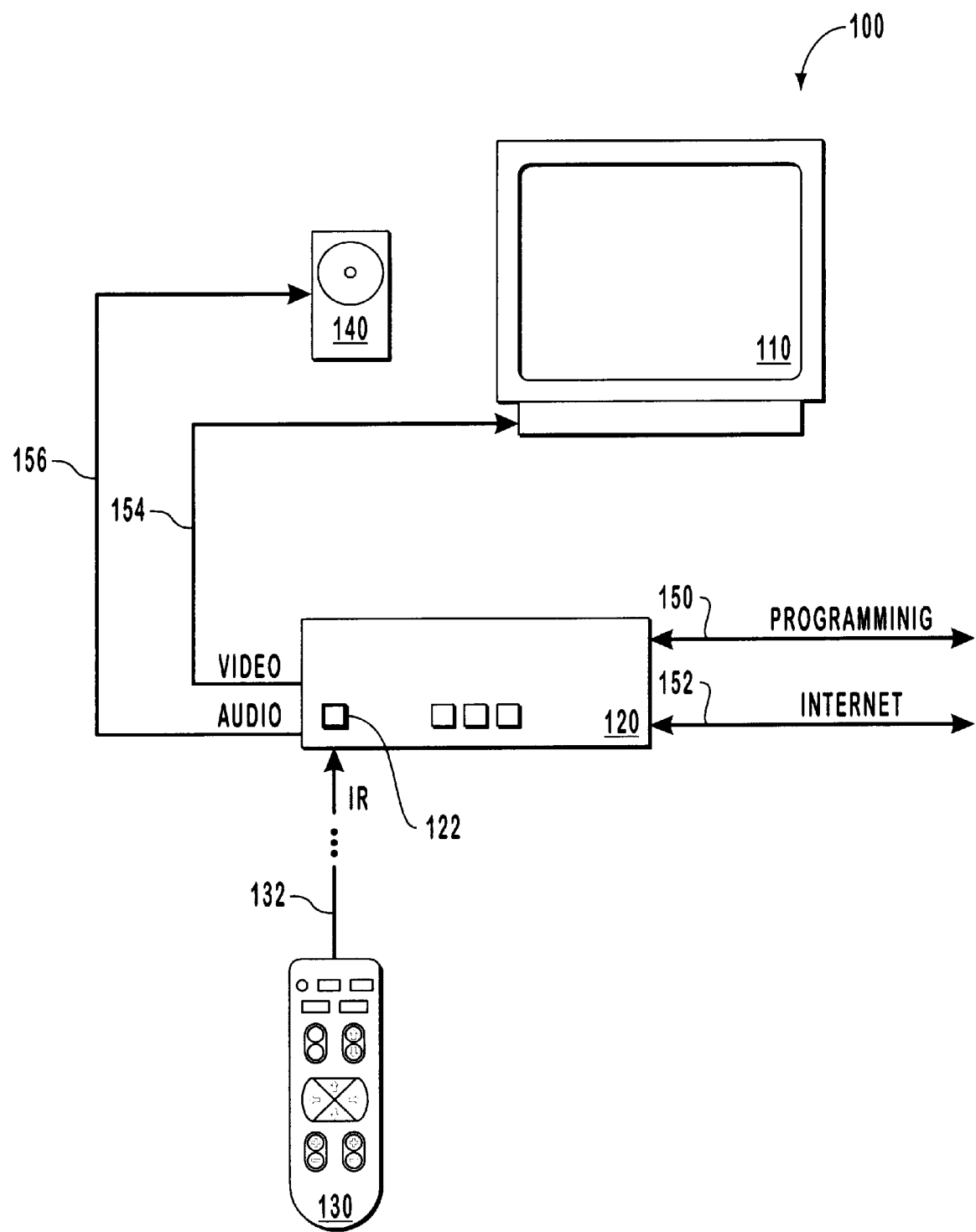
FIG. 1 is a schematic drawing of a suitable operating environment for the present invention.

The present invention extends to both methods and systems for tracking viewer behavior information of advertisements viewed on a home entertainment system. In accordance with the present invention, specific information regarding advertisement viewing behavior of home entertainment systems is automatically obtained. In one embodiment, the information is obtained through an event initiated by the receipt and recognition of a marker embedded in an advertisement displayed on a home entertainment system. In another embodiment, the information is obtained by supplementing a conventional electronic program guide with information specifying the broadcast times and channels of advertisements. If the home entertainment system has tuned to the particular channel at the particular time of the advertisement as specified in the electronic program guide, the advertisement is assumed to have been viewed at the home entertainment system. The viewing behavior information thus compiled can be periodically transmitted to a remote site.

The invention also extends to novel electronic program guides that include information identifying an advertisement. For example, the electronic program guides of the invention include those that enable advertisements to be identified and corresponding viewing information to be compiled as disclosed herein.

The invention is described below by using diagrams to illustrate either the structure or processing of embodiments used to implement the systems and methods for tracking viewer behavior in a home entertainment system. Using the diagrams in this manner to describe the present invention should not be construed as limiting its scope.

The embodiments of the present invention may comprise a special purpose or general purpose computer including various computer hardware, as discussed in greater detail below. The embodiments may further comprise multiple computers linked in a network environment. Embodiments within the scope of the present invention also include computer-readable media having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer.

When information is transferred or provided over a network or another communications connection to a computer, the computer properly views the connection as a computer-readable medium. Thus, such a connection is also properly termed a computer-readable medium. In addition, a signal that carries information, such as data structures or computer-executable instructions, is properly termed a computer-readable medium. For example, a television signal, when carrying data or instructions that can be processed by a computer is a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

In one embodiment, the invention is implemented in a system known as a WEBTV® set-top box, developed by WebTV Networks, Inc. of Mountain View, Calif., having been adapted to perform the operations disclosed herein. A WEBTV® set-top box uses a conventional television screen or other display unit to display information and includes a networked computer for composing, sending and receiving e-mail, browsing the World Wide Web (Web), accessing other segments of the Internet, and otherwise displaying information. A WEBTV® set-top box uses standard telephone lines, Integrated Services Digital Network (ISDN) lines, cable lines associated with cable television service, or the like to connect to the Internet or other wide area networks.

FIG. 1, along with the corresponding discussion, is intended to provide a general description of a suitable environment in which the invention may be implemented. FIG. 1 specifically illustrates a basic home entertainment system. Such a home entertainment system generally includes a display device to which an abundance of devices may be connected. The connected devices might include, for example, a video cassette recorder (VCR), a video game system, a stereo system, cable television, a cable box, DSS/DVB, DVD, a set-top box that serves as an Internet terminal, or any other apparatus or combination that is capable of receiving a signal.

Therefore, for purposes of this description and in the claims, a "home entertainment system" may simply be a television set coupled with a processing device for performing the data processing steps disclosed herein, or can be as complex as desired, with any number of consumer electronic devices being attached to a display device, one of which having a processing device for performing the data processing steps disclosed herein. Moreover, "home entertainment system" is to be understood as a term that broadly describes a television viewing environment, whether it is located in a viewer's home, at a place of business, in the public, or at any other location. While the invention can be advantageously implemented in the environment illustrated in FIG. 1, it can also be practiced in any number of other systems that will be understood by those skilled in the art upon learning of this disclosure, such as in combination with a VCR, a video game system, a stereo system, a television with data processing capabilities, a cable television box, DSS/DVB, DVD, a set-top box that serves as an Internet terminal, and/or any other device capable of processing date as described herein.

In one embodiment, as shown in FIG. 1, home entertainment system 100 includes display device 110 and speaker device 140. Display device 110 could be a high definition television display, a standard television display, a flat panel display, a projection device, or any other device capable of displaying viewable video image data. Speaker device 140 could be a speaker, a stereo system, or any device capable of emitting video sound data. Speaker device 140 could be integrally positioned with respect to display device 110. For example, display device 110 may be a television monitor, and speaker device 140 may be a television speaker integrated with the television monitor.

Home entertainment system 100 further includes a means for receiving programming. In this description and in the claims, "programming" includes both the viewable portions of the moving image data (herein, "viewable video image data") and its associated sound data (herein, "video sound data"). By way of example, FIG. 1 depicts the transmission of programming to home entertainment system 100 via programming input line 150. Programming input line 150 could be a cable, an antenna system device, a satellite system device, or any device or system capable of transmitting programming to home entertainment system 100. Home entertainment system 100 may further include a means for receiving Internet line 152 for bi-directional data exchange over the Internet.

The means for receiving programming input line 150 and the means for receiving Internet line 152 are shown collectively and by way of example in FIG. 1 as management device 120. Management device 120 may be a set-top box that includes a connection for programming input line 150 in order to receive programming and a connection for Internet line 152 in order to send and receive data over the Internet. Management device 120 may be integrated with display device 110. Alternatively, the management device 120 may stand separate from display device 110.

Home entertainment system 100 also includes a means for receiving instructions from a viewer. FIG. 1 depicts such means for receiving instructions from a viewer as sensor 122 which receives viewer input from input device 130. Input device 130 can be a remote control, a keyboard, a microphone, or any device capable of generating electronic instructions for control of management device 120. Input device 130 is communicatively coupled to management device 120 over input link 132 so as to enable such control. Input device 130 generates electronic instructions over input link 132 in response to preprogrammed data or in response to a viewer pressing buttons on input device 130. Input device 130 may also control Web browser software within management system 120 as when management system 120 is a WEBTV® set-top box that has been adapted to perform the operations disclosed herein. For example, input device 130 may be programmed to turn on home entertainment system 100 and to tune management device 120 to a channel.

A means for providing video image data from management device 120 to display device 110 is shown by way of example as video image link 154. Video image link 154 may be any link capable of providing video image data to display device 110 such as, for example, a radio-frequency (RF) link, an S-video link, a composite link, or any other equivalent form of video image link.

A means for providing video sound data from management device 120 to speaker device 140 is shown by way of example as video sound link 156. Video sound link 156 may be any link capable of providing video sound data to speaker device 140 such as, for example, a radio-frequency (RF) link, a wired link, or any other equivalent form of video sound link.

A method according to one embodiment of the present invention is initiated upon the occurrence of an advertisement event at home entertainment system 100. In this description and in the claims, the term "event" includes any occurrence or action that can be interpreted by the home entertainment system as an indication of the display of a particular advertisement at the home entertainment system. One example of an event is the identification of a marker that is embedded in an advertisement and received by a home entertainment system. The marker is placed in the advertisement, for example, by the broadcaster airing the programming or by the creator of the advertisement.

The marker can be any manner of data identifying the specific advertisement aired. By way of example, the marker could contain data that has the format of a Uniform Resource Identifier (URI), or another code embedded in the VBI or the overscan region of the television signal that carries the advertisement. As used herein, the term "Uniform Resource Identifier" is given its currently accepted meaning and extends to any Uniform Resource Locator, Uniform Resource Name, or any other string, code, name, or address that refers to a resource or object associated with the Internet. The marker is typically, but not necessarily, invisible to the user but it is visible to the logging mechanism of management device 120. In addition, the marker can be unique to a specific time that an advertisement is aired, it could be unique to a particular advertisement, or unique to a particular advertiser.

Alternatively, an advertisement could be identified in other manners. For example, in one embodiment, the pattern of the audio and/or video signal waveforms could be analyzed to identify an advertisement. In another embodiment the closed captioning text could identify the advertisement. In yet another embodiment a marker could be inserted in the VBI.

As mentioned above, an event can trigger the creation of viewing behavior information. By way of example, one such event that can trigger the creation of viewing behavior information relating to an advertisement is a determination by a processing device associated with the home entertainment system that a particular channel is tuned at the home entertainment system at a particular time, where an electronic program guide specifies that a particular advertisement is to be broadcast on the particular channel at the particular time. In this manner, the combined operation of the tuner and the electronic program guide provides the basis for an assumption that the particular advertisement is being displayed on the display device.

Other events can be used with the invention. For example, another event is an instructional input received by a home entertainment system, whereby the programming displayed at the home entertainment system is selected, changed, terminated, or otherwise manipulated. The input may be entered by the viewer or some other source. Other examples of events include the request to employ a closed captioning mode, to use a picture-in-picture feature, to access the Internet while tuned to a channel that is airing an advertisement, or the turning off of the power of a home entertainment system, indicia of channel surfing prior to or in response to an advertisement, or the like. Once the event occurs, management device 120 records the event and stores its occurrence and description information in local storage. The local storage could be located in a variety of locations within home entertainment system 100. One such location could be internal to management device 120, as will be further explained below.

As noted previously, one embodiment of the invention uses a marker embedded in the television signal that carries an advertisement. In this embodiment, management device 120 examines the television signal for the inclusion of a marker associated with an advertisement. When a marker is encountered, the marker is coupled with information, such as the current date and time, to generate viewing behavior information. In this embodiment, the viewing behavior information simply includes the marker identified at the home entertainment system (or some derivative of the marker) and any other desired information associated with the advertisement having been received and displayed at the home entertainment system.

As successive advertisements are received, viewing behavior information for any advertisements that have markers can be generated and stored. If for example, the markers have the format of URIs or other similar data structures, the viewing behavior information recorded at the home entertainment system can include a list or compilation of URIs, each of which represents an instance of a particular advertisement being displayed or viewed. The viewing behavior information is later transmitted to a clearinghouse, where it is used to maintain a database of advertising viewing at any number of home entertainment systems. If the viewing behavior information includes a list or compilation of URIs, the clearinghouse can store the URIs, themselves, in the database. Alternatively, the clearinghouse can use the URIs to access information that more directly describes or identifies the advertisements, with the accessed information being added to the database.

As noted previously, another embodiment of the invention identifies an instance of an advertisement by referring to advertisement information that has been added to an electronic program guide. In this embodiment, an electronic program guide stored at the home entertainment system includes information specifying an advertisement, a channel on which the advertisement is to be broadcast, and the time of the broadcast. In this embodiment, the advertising event occurs when the channel is tuned at the home entertainment system at the broadcasting time of an advertisement, as specified by the electronic program guide.

Once the event occurs according to this embodiment, management device 120 couples the occurrence of the event with the information, stored in the electronic program guide, which identifies the advertisement. In this manner, the viewing behavior information is generated and stored at the home entertainment system in response to the event describes or identifies the advertisement. In addition, the viewing behavior information can include any other relevant data, such as the date and time of the advertisement, an identifier for the television programming associated with the advertisement, the identify of a viewer associated with the home entertainment system, the identity of the home entertainment system, and the like. Furthermore, because an electronic program guide is utilized in this embodiment, the viewing behavior information can include any additional data retrieved from the electronic program guide.

The data that constitutes the electronic program guide can be stored in local storage and received via Internet line 152 or from a number of other transport mechanisms on a periodic basis. Electronic program guides are widely commercially available, and general concepts relating thereto will be understood by those skilled in the art. This embodiment of the invention can be practiced with substantially any existing or new source of electronic program guide data, so long as the electronic program guide is supplemented with at least some information identifying advertisements.

Typically, the information available through the electronic program guides is very diverse, yet very specific. Examples of information that can be included in an electronic program guide are described in U.S. patent application Ser. No. 09/376,632, which is entitled "Tracking Viewing Behavior of a Home Entertainment System", filed on the same day as this patent application, and incorporated herein by reference. In addition to the information retrieved from the electronic guide to identify the advertisement, any further information from the electronic program guide may be added to the viewing behavior information that is generated and stored in response to the advertisement event. In one embodiment the supplemental information may be added to the event description stored locally. In another embodiment, only unique identifiers that are associated with the advertisement, program and channel are stored locally thereby increasing the efficiency of compiling the viewing behavior information and transmitting it to a central clearinghouse. Supplemental information may then be joined to the viewing behavior information through the use of one or more databases located at the central clearinghouse.

After an event is detected by management device 120, coupled to corresponding electronic program guide information, and stored in local storage, management device 120 may detect a subsequent event. By way of example, and not limitation, a subsequent event may include such events as sending input information to tune to another channel, to have subtitles appear on display device 110 during the advertisement programming, to initiate the mute function, to simultaneously watch multiple channels through the use of a picture in picture feature, or to simultaneously view television programming while using the Internet. A subsequent event can also be the changing of advertisement programming on a station, namely, the ending of a first advertisement and beginning of a subsequent advertisement. Therefore, as each subsequent event is received by management device 120, a similar process takes place, in that the subsequent event is coupled to corresponding electronic program guide information and stored in local storage. Therefore the invention continually tracks and maintains an abundance of specific information for each and every event performed relevant to an advertisement viewed on a home entertainment system 100.

Many of the foregoing events, and others that can be used with the invention, can provide insight to advertisers or other interested parties regarding the response of viewers to advertisements. For example, an advertiser might learn that viewers frequently tune to another channel upon seeing the beginning of an advertisement.

Some home entertainment systems are coupled with internet terminals that permit viewers to select and view interactive multimedia content in response to television programming or advertisements. For example, WebTV Networks, Inc., of Mountain View, Calif., provides this capability in combination with WEBTV® set-top boxes and some television programming. According to one embodiment of the invention, the viewing behavior information can include information relating to viewers' utilization of links to interactive multimedia content associated with advertisements or television programs. For instance, the home entertainment system might display a link to detailed information regarding a product that is presented in an advertisement. If the user selects the link, the home entertainment system would then display interactive multimedia content containing the detailed product information. In response, the viewing behavior information can be supplemented with information indicating that the link has been selected. Examples of interactive multimedia content include an Internet document, such as those commonly known as World Wide Web ("Web") pages, or a multimedia document stored locally at the home entertainment system.

As noted previously, the date and time that the events are performed can also be tracked and recorded according to one embodiment of the invention. In order to do so, home entertainment system 100 can be preprogrammed with or have access to the current date and time. In one embodiment, a clock programmed with the current time, current data, relevant time zone, current week number, and current day of the week is located in management device 120. As an event is received by management device 120, the event is marked with the time and date that the event occurred.

By having each event marked with the time and date that the event was performed, a processor in home entertainment system 100 is able to determine the viewing start time, the viewing stop time, the start and stop time of any event, and the length of time between any two events. By way of example, the processor may reside within management device 120 as shall be further explained below. The processor is able to further determine and store such details as the length of time that home entertainment system 100 is in use, the percentage of the day that home entertainment system 100 is in use, the length of time that each advertisement programming was viewed, the percentage of any specific advertisement programming viewed, the portion of the advertisement programming not viewed, the frequency to which events occurred, and the amount of viewing that would be classified as "channel surfing."

Figure 2:
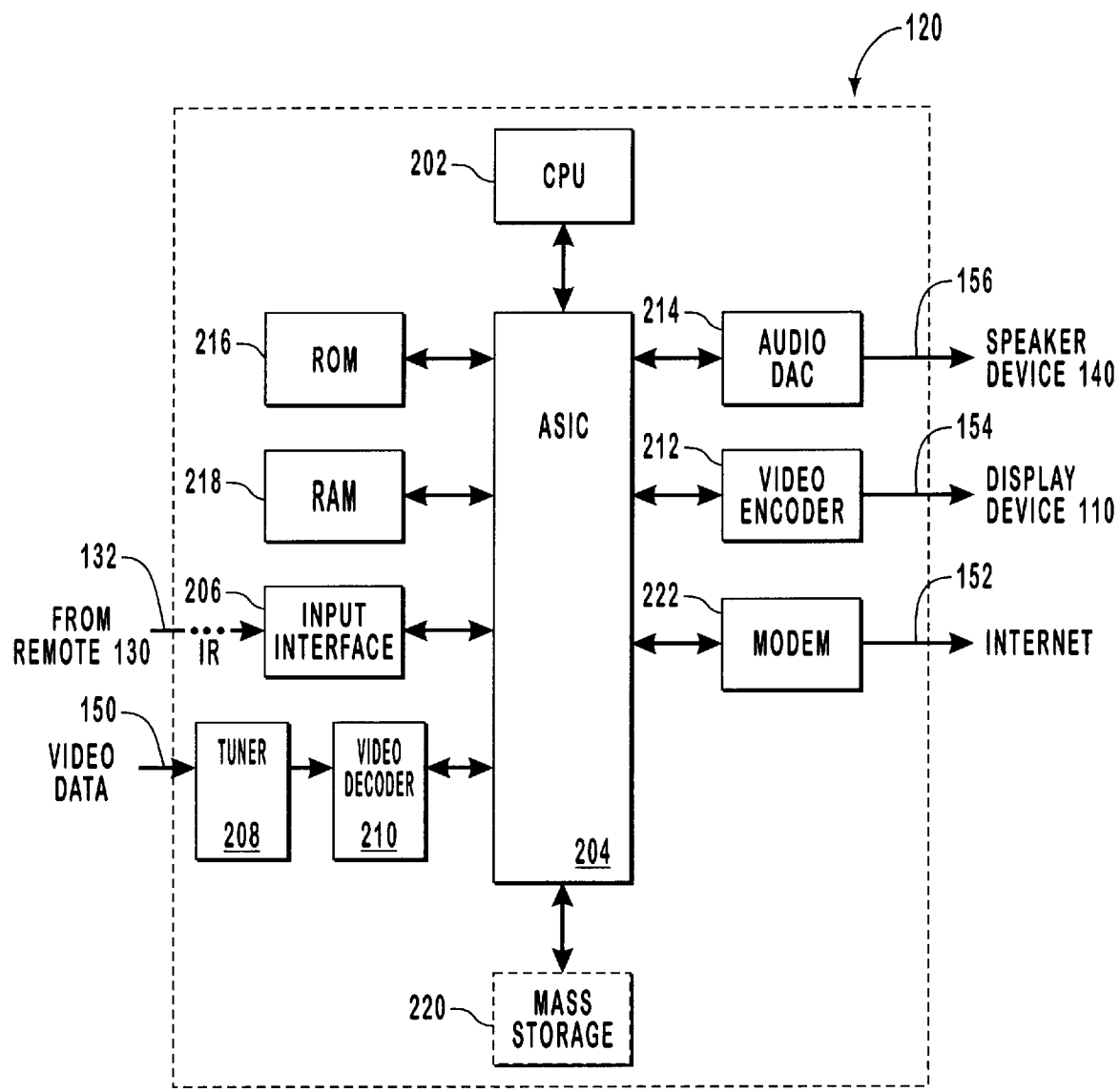
FIG. 2 is a schematic drawing of the management device of FIG. 1.

Now referring to FIG. 2, a block diagram of the internal features of management device 120 is illustrated according to an embodiment of the invention wherein management device 120 is a set-top box. The operation of management device 120 is controlled by Central Processing Unit (CPU) 202, which is coupled to an Application-Specific Integrated Circuit (ASIC) 204. CPU 202 executes software designed to implement features of management device 120 including features of the present invention. ASIC 204 contains circuitry which is used to implement certain functions of management device 120.

Instructions, data, and other software necessary for the herein described operation of CPU 202 and ASIC 204 may be stored, for example, in read-only memory (ROM) 216, random-access memory (RAM) 218, and/or mass storage device 220. Mass storage device 220 may be any mass memory means capable of storing large amounts of data such as a magnetic or optical disk drive. It is on mass storage device 220 that the electronic program guide, the events marked with the date and time that the events occurred, and the corresponding electronic program guide information relating to each event can be stored. ROM 216, RAM 218 and mass storage device 220 are communicatively coupled to ASIC 204 so as to be readable by ASIC 204 and so that data may be written from ASIC 204 to RAM 218 and possibly mass storage device 220.

Management device 120 includes a means (e.g., video encoder 212) for providing video image data on video image link 154 to display device 110, and a means (e.g., audio DAC 214) for providing video sound data on video sound link 156 to speaker device 140. If the video data on video input line 150 includes video data of multiple channels, the means for providing and recognizing the video data include a means for tuning to a desired channel of the video data on video input line 150. The means for tuning is represented in FIG. 2 as tuner 208 and may include any device capable of tuning to a desired channel of a video signal.

In one embodiment tuner 208 is controlled by input device 130. Referring back to FIG. 1, input device 130 generates an electronic instruction to tune to a desired channel and transmits that electronic instruction over input link 132 to management device 120. Referring to FIG. 2, the electronic instruction is received by input interface 206 and provided to ASIC 204 that in turn transforms the electronic instruction, if necessary, to be recognizable by tuner 208. Video decoder 210 is used for converting video data from an analog format to a digital format, or from a digital format to an analog format, in the event that ASIC 204 and tuner 208 employ different formats. The electronic instruction is then transmitted to tuner 208. The act of receiving viewer input and tuning to the requested channel using tuner 208 is interpreted by management device 120 as the occurrence of an event that is eligible to be characterized or described with viewing behavior information.

In the embodiment of FIG. 2, home entertainment system 100 is associated with Internet line 152 that enables the home entertainment system to receive the data that constitutes the electronic program guide. In alternative embodiments, the electronic program guide data can be delivered to the home entertainment system using direct-dial communication over standard telephone lines or data transmission over the cable television infrastructure, a satellite network, over-the-air broadcasting or any other available medium.

Management device 120 periodically transmits the viewing behavior information that it has compiled to a central location. Management device 120 can transmit the viewing behavior information via Internet line 152, by direct-dial communication over standard telephone lines with modem 222, or using any other available communication medium.

Figure 3:
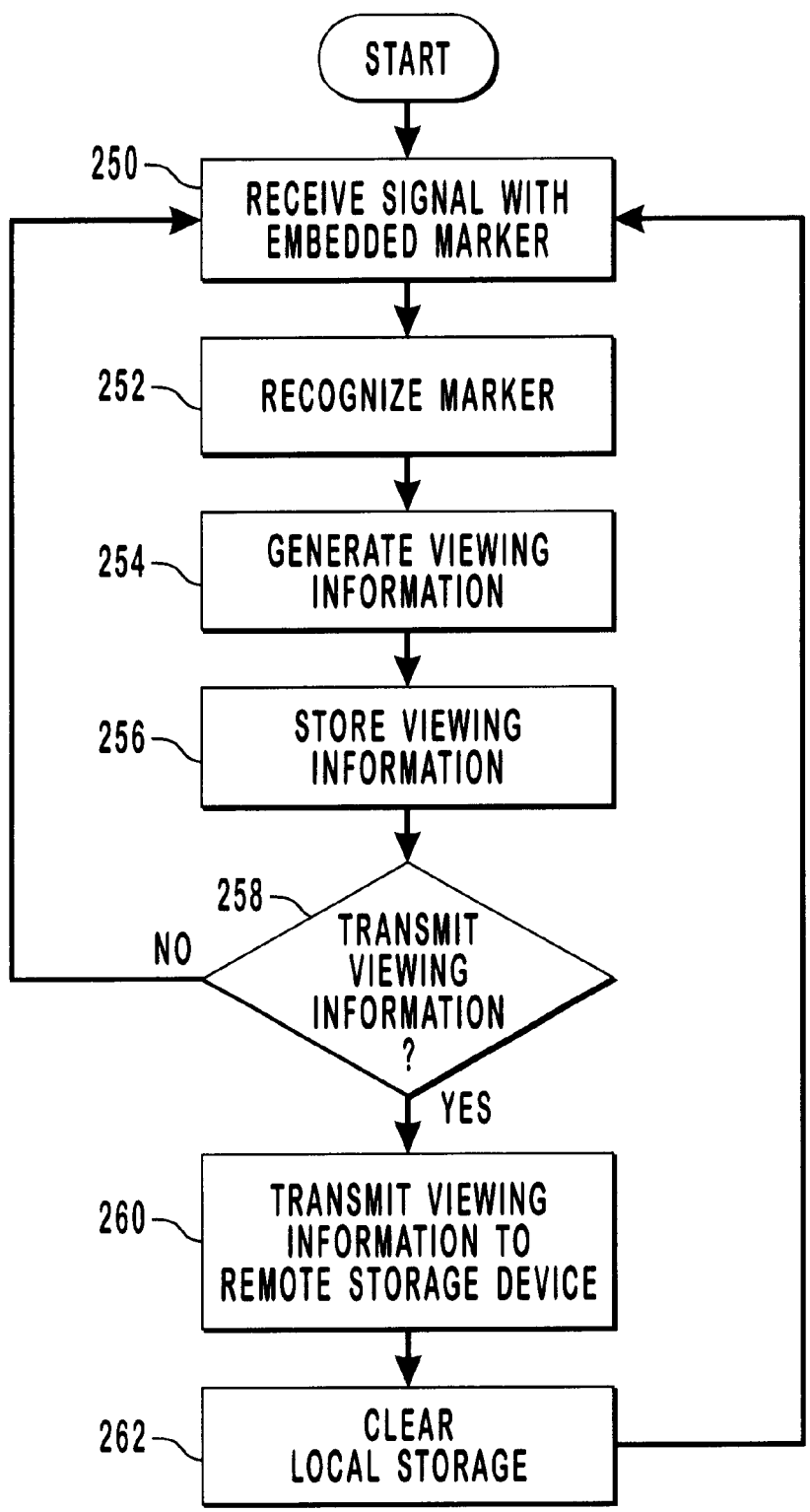
FIG. 3 is a flowchart illustrating a method for obtaining viewing information identifying advertisements viewed on a display device according to one embodiment of the invention.
Figure 4:
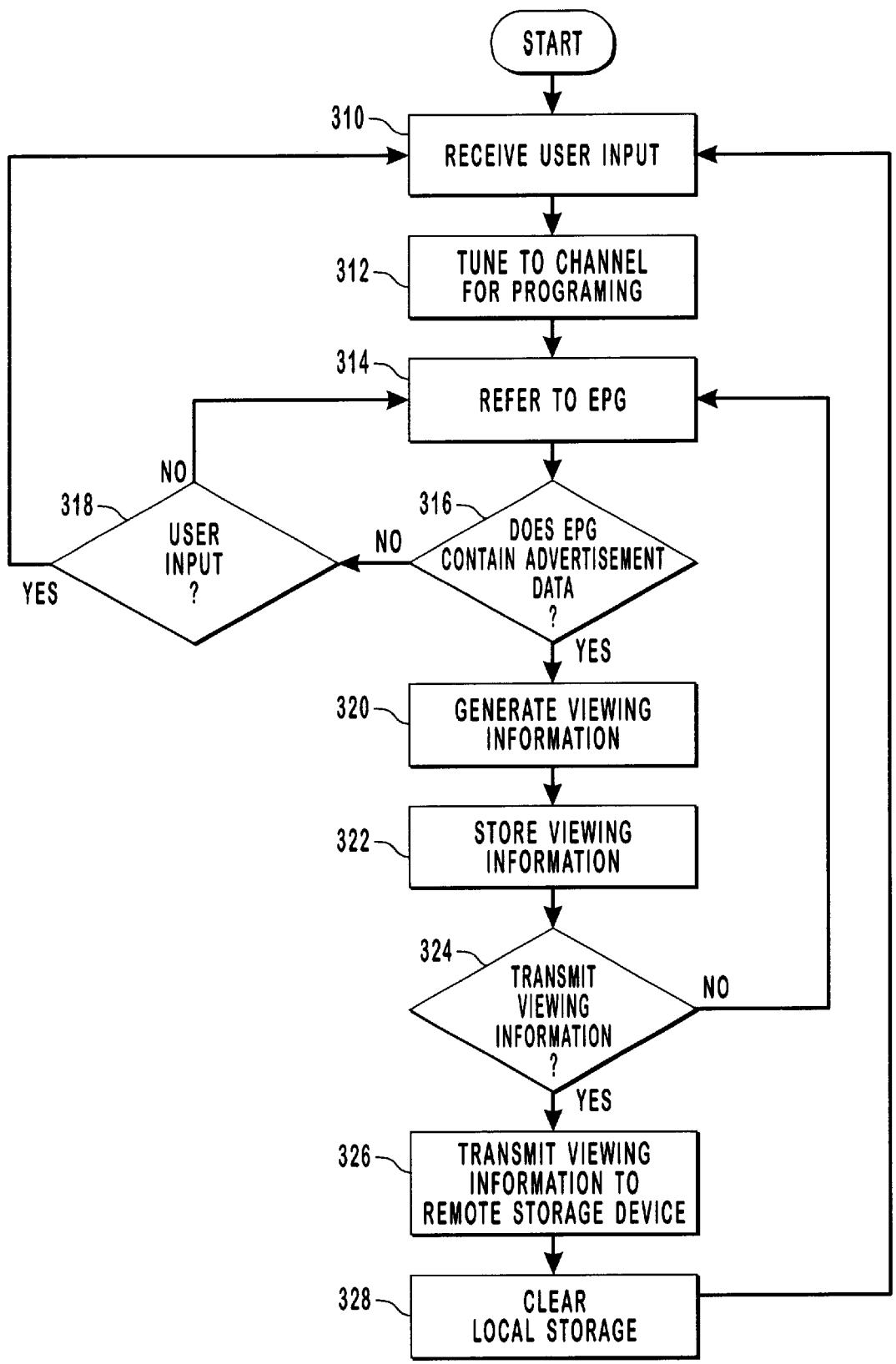
FIG. 4 is a flowchart illustrating a method of obtaining viewing information identifying advertisements viewed on a display device according to another embodiment of the invention.

Referring again to FIG. 2, ASIC 204 operates in conjunction with CPU 202 and uses computer-executable instructions implemented in software and/or hardwired logic circuitry to perform the steps set forth in the flowcharts of FIGS. 3 and 4. These computer-executable instructions may be stored in ROM 216, RAM 218, or mass storage device 220.

Referring now to FIG. 3, a flowchart is provided to illustrate the general steps for obtaining viewing information identifying advertisements viewed on display device 110 according to an embodiment of the invention that uses markers embedded in the television signal. In step 250, management device 120 (or any other electronics device in which the invention is implemented) receives the television signal that has a marker embedded therein that identifies an advertisement. In step 252, the management device recognizes the marker. For example, the management device might be tuned to a channel 7, whereupon it recognizes a marker that is embedded in the signal associated with channel 7.

In response to the recognized marker, the management device generates the viewing information in step 254. As shown at step 256, the management device then stores the viewing information at, for example, mass storage 220 of FIG. 2. As noted previously, the stored viewing information is periodically transmitted to a central or remote location. If the time for transmitting the viewing information has arrived, the method advances from decision block 258 to step 260, in which the viewing information is sent and to step 262, in which the local storage is cleared. Otherwise, the method returns to step 250, where the process of compiling viewing information relating to advertisements continues.

Referring now to FIG. 4, a flowchart is provided to illustrate the general steps for obtaining viewing information identifying advertisement programming viewed on display device 110 according to an embodiment that utilizes an electronic program guide to identify advertisements. In step 310, management device 120 (or any other electronic device in which the invention is implemented) receives user input, such as powering on the television display, selecting a channel, etc. In response to the event, management device 120 tunes to a channel in step 312.

According to this embodiment, management device 120 refers, in step 314, to an electronic program guide stored at the home entertainment system and determines whether it contains advertisement information associated with the tuned channel and the current time. For example, channel 8 might be tuned at 8:15 p.m., local time. Furthermore, the electronic program guide might indicate that an advertisement for a product of Corporation X is scheduled to be broadcast on channel 8 at 8:15 p.m. If this is the case, decision block 316 is answered affirmatively, and the method proceeds to step 320, in which management device 120 generates viewing information.

Returning now to decision block 316, if the electronic program guide does not indicate that an advertisement is currently being broadcast on the tuned channel, the method advances to decision block 318. If there is no user input for changing the channel or otherwise controlling the operation of the tuner, the method proceeds from decision block 318 back to step 314, in which the electronic program guide is monitored. Otherwise the method returns to step 310. In effect, steps 314, 316, and 318 illustrate that management device 120 can repeatedly or continually refer to the electronic program guide so long as the tuner continues to tune the selected channel. Thus, any advertisement that is specified in the electronic program guide for the tuned channel can be identified. As used herein, the term "tune" as used in relationship with a channel can include both the initial act of tuning to a channel and an ongoing or continual act of tuning to a channel.

Returning now to step 320, management device 120 generates the viewing information and stores it in step 322. The viewing information can be stored, for example, on mass storage 220 of FIG. 2. After the viewing information is stored locally, decision block 324 determines whether or not to transmit the viewing information via Internet line 152 or some other communication medium to a central clearinghouse that is remote with respect to the home entertainment system. If it is not time to transmit the viewing information, the process returns to step 314, where the management device again refers to the electronic program guide. If it is time to transmit the viewing information, then that act of transmitting takes place in step 326 and the local storage is cleared and made ready to store future viewing information in step 328.

As explained above, the invention is directed to an automated system and method for tracking viewer behavior of advertisements aired on a home entertainment system. The invention can be utilized in a network of home entertainment systems such as for example a system of set-top boxes. As such, the viewer behavior of each home entertainment system is stored locally in each home entertainment system and is periodically transmitted to one or more central clearinghouses that are generally remote with respect to the home entertainment systems. A storage device at the clearinghouse gathers the viewer behavior from the myriad of home entertainment systems and a processor at the clearinghouse further processes the viewing behavior information and/or makes it available to interested entities.

Figure 5A:
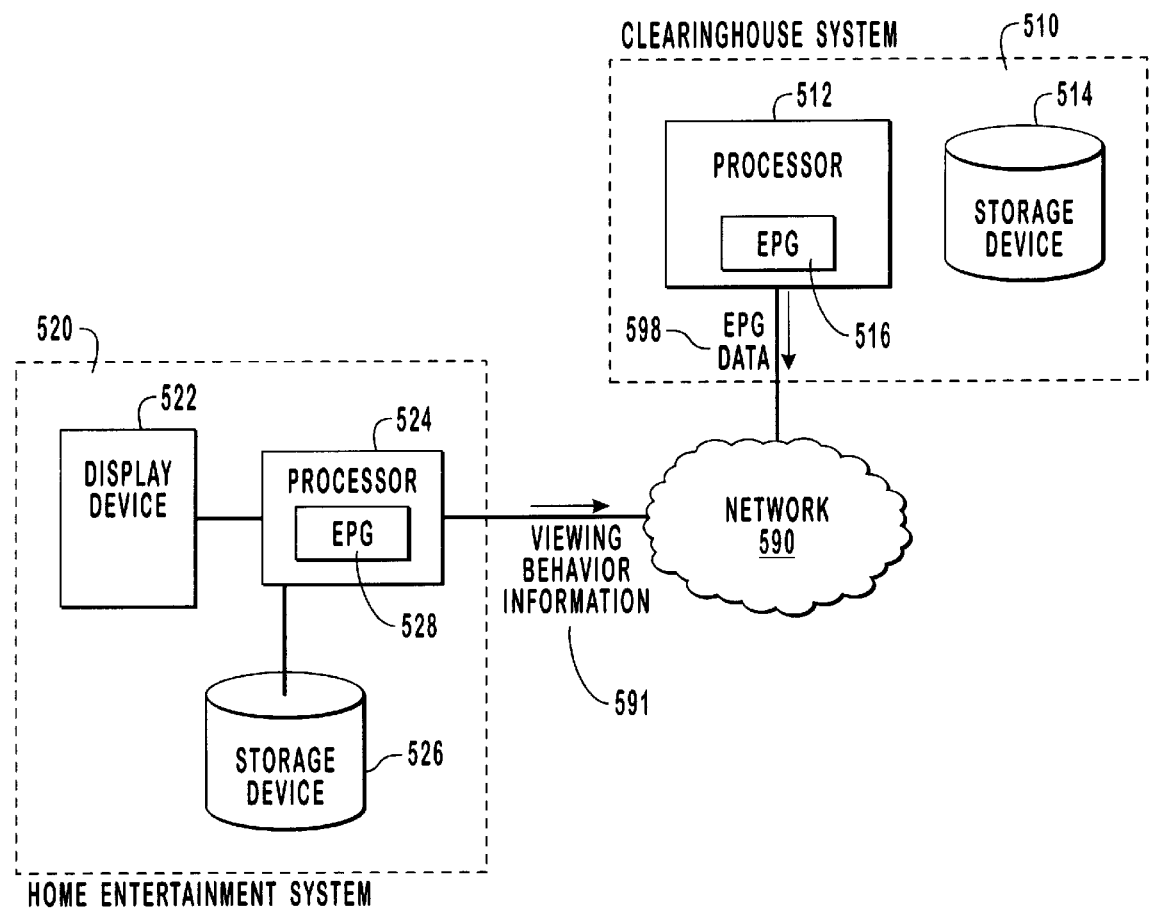
FIG. 5A is a schematic drawing of a home entertainment system connected via network to a clearinghouse system.

FIG. 5A illustrates the interaction between a home entertainment system and a clearinghouse according to one embodiment of the invention that utilizes an electronic program guide ("EPG") to identify advertisements. Home entertainment system 520 includes display device 522, processor 524, EPG 528, and storage device 526. Clearinghouse system 510 includes processor 512, storage device 514 and, optionally, EPG 516. Home entertainment system 520 and clearinghouse system 510 are connected via network 590.

As explained above, the operation of the tuner, in combination with advertisement information stored in the EPG results in creation of advertisement viewing behavior information that includes, for example, the date and time of the advertisement and descriptive information for the advertisement retrieved from EPG 528. The viewing behavior is stored locally on storage device 526. Upon the occurrence of a subsequent event, another instance of advertisement viewing behavior information is similarly created and stored on storage device 526. Thus, a sequential log is recorded and stored locally on storage device 526 that provides a description of the programming that was viewed on display device 522 and how it was displayed.

Periodically, processor 524 prepares a report of the sequential log of advertisement viewing behavior for transmission via network 590 as illustrated in FIG. 5A as viewing behavior information 591. Clearinghouse system 510 receives viewing behavior information 591 via network 590 and stores viewing behavior information 591 in storage device 514. Upon transmission of the viewing behavior information or upon confirmation from clearinghouse system 510 that viewing behavior information 591 is stored on storage device 514, processor 524 clears the transmitted viewing behavior information from storage device 526 and awaits the occurrence of a subsequent event.

In order to maintain accurate and current programming information at home entertainment system 520, EPG 528 is periodically updated. The updating of EPG 528 can take place in a number of ways. By way of example, EPG 528 could be updated via direct-dial communication over standard telephone lines, a satellite communication system, or over a network, including the Internet. The updating information can come from a variety of sources such as from clearinghouse system 510 or from a separate source. FIG. 5A illustrates one embodiment whereby EPG 528 may be updated. In this embodiment all current programming information is provided and updated on EPG 516. Clearinghouse system 510 then periodically updates EPG 528 through the following acts: Processor 512 gathers the information required from EPG 516 and transmits it via network 590, as illustrated in FIG. 5A as EPG data 598; and processor 524 receives EPG data 598 via network 590 and updates EPG 528. As such, EPG 528 maintains accurate and current programming information.

Figure 5B:
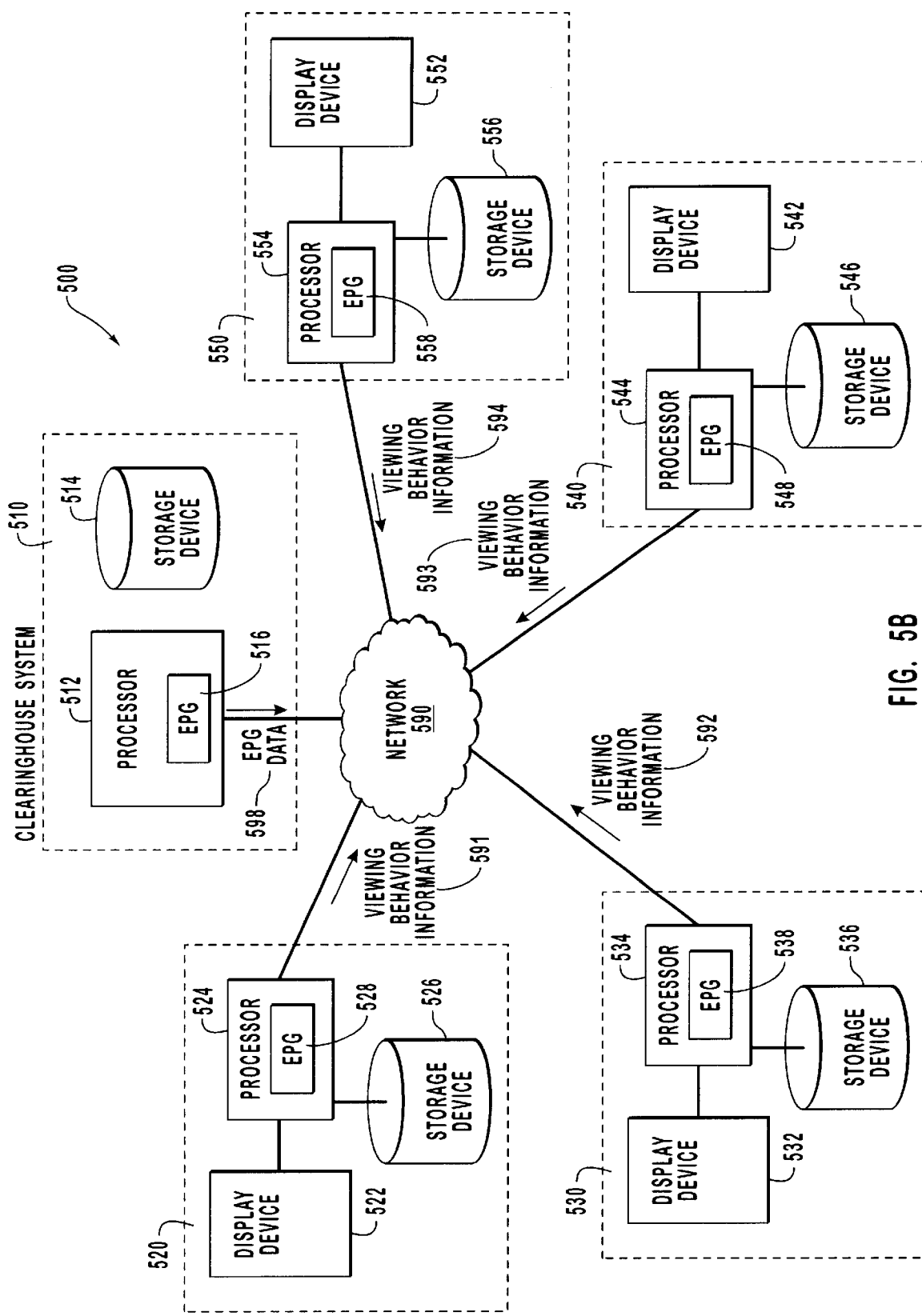
FIG. 5B is a schematic drawing of a plurality of home entertainment systems connected via a network to a clearinghouse system.

As explained above, FIG. 5A illustrates the transmission of data between a home entertainment system and a clearinghouse system via a network. Referring now to FIG. 5B, a network system illustrated generally as 500 demonstrates the transmission of data between a plurality of home entertainment systems and a clearinghouse system via a network. The home entertainment systems are respectively represented as home entertainment systems 520, 530, 540 and 550. The networked system illustrated in FIG. 5B is representative of networks having any number of associated home entertainment systems.

A home entertainment system can include a plurality of consumer electronic devices, but for the purposes of illustration each home entertainment system 520, 530, 540, and 550 of FIG. 5B includes a display device 522, 532, 542, and 552, a processor 524, 534, 544, and 554, an EPG 528, 538, 548, and 558, and a local storage device 526, 536, 546, and 556. Processors 524, 534, 544, and 554 independently gather and transmit the advertisement viewing behavior information respectively stored on local storage devices 526, 536, 546, and 556. The advertisement viewing behavior information is illustrated as viewing behavior information 591, 592, 593, and 594, and is transmitted to clearinghouse system 510 via network 590 and stored on storage device 514. Upon transmission of the advertisement viewing behavior information or upon confirmation from clearinghouse system 510 that the viewing behavior information is stored on storage device 514, processor(s) 524, 534, 544, and 554 independently clear the transmitted viewing behavior information from storage device(s) 526, 536, 546, and 556, and await the occurrence of subsequent events.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a home entertainment system, a method for determining whether a viewer is present when an advertisement is presented for display at the entertainment system, and for tracking behavior of the viewer that is present in relation to an advertisement displayed on the home entertainment system, the method comprising:

storing, at the home entertainment system, an electronic program guide that includes data relating to an advertisement aid specifying a time when the advertisement is scheduled to be broadcast on a particular channel;

tuning, at the home entertainment system, a television signal that carries an advertisement that has embedded therein a marker indicating that the advertisement is carried by the television signal;

detecting an advertising event at the home entertainment system and determining that an advertisement is being presented for display to the viewer by recognizing the presence of the marker;

upon determining that the advertising is being presented for display, based on the presence of the marker, obtaining the data that relates to the advertisement from the electronic program guide and coupling the electronic program guide data with the advertising event;

determining that the viewer is present while the advertisement is being presented for display at the home entertainment system by detecting a viewer-initiated event comprised of an electronic instruction input to the home entertainment system by the viewer; and storing at the home entertainment system electronic data based on the type of detected viewer-initiated event in order to derive from the data information about the viewer's behavior in response to the displayed advertisement.

2. A computer program product comprised of a computer-readable medium for carrying executable instructions for electronically implementing at a home entertainment system a method for determining whether a viewer is present when an advertisement is presented for display at the entertainment system, and for tracking behavior of the viewer that is present in relation to all advertisement displayed on the home entertainment system, and wherein the method comprises:

storing, at the home entertainment system, an electronic program guide that includes data relating to an advertisement and specifying a time when the advertisement is scheduled to be broadcast on a particular channel;

tuning, at the home entertainment system, a television signal that carries an advertisement that has embedded therein a marker indicating that the advertisement is carried by the television signal;

detecting an advertising event at the home entertainment system and determining that an advertisement is being presented for display to the viewer by recognizing the presence of the marker;

upon determining that the advertisement is being presented for display, based on the presence of the marker, obtaining the data that relates to the advertisement from the electronic program guide and coupling the electronic program guide data with the advertising event;

determining that the viewer is present while the advertisement is being presented for display at the home entertainment system by detecting a viewer-initiated event comprised of an electronic instruction input to the home entertainment system by the viewer; and storing at the home entertainment system electronic data based on the type of detected viewer-initiated event in order to derive from the data information about the viewer's behavior in response to the displayed advertisement.

3. A method as recited in claim 1 or 2, further comprising, in response to the detected viewer-initiated event, generating information that identifies the advertisement and the viewer-initiated event.

4. A method as recited in claim 1 or 2, further comprising the act of transmitting the information to a location that is remote with respect to the home entertainment system.

5. A method as recited in claim 3, wherein the act of generating further comprises the acts of:

retrieving data that identifies a television program associated with the advertisement from the electronic program guide; and including the data that identifies the television program in the information that identifies the advertisement.

6. A method as recited in claim 3, wherein the act of generating further comprises the act of including, in the information identifying the advertisement, data specifying the date and time of the advertisement.

7. A method as recited in claim 1 or 2, wherein the marker identifies the advertisement.

8. A method as recited in claim 1 or 2, wherein the marker identifies an advertiser associated with the advertisement.

9. A method as recited in claim 1 or 2, wherein the marker has a format of a Uniform Resource Identifier.

10. A method as recited in claim 3, wherein the act of generating comprises the act of including the marker in the information identifying the advertisement.

11. A method as recited in claim 3, wherein the act of generating comprises the act of including data derived from the marker in the information identifying the advertisement.

12. A method as recited in claim 3, wherein the act of generating comprises the acts of:

retrieving, from an electronic program guide stored at the home entertainment system, data that identifies a television program associated with the advertisement; and including the data that identifies the television program in the information that identifies the advertisement.

13. A method as recited in claim 3, wherein the act of generating further comprises the act of including, in the information identifying the advertisement, data specifying the date and time of the advertisement.

14. A method as recited in claim 3, wherein the act of generating further comprises the act of including, in the information identifying the advertisement, data identifying one of the home entertainment system and a viewer of the home entertainment system.

* * * * *